(12) United States Patent
Nagata et al.

(10) Patent No.: US 9,819,474 B2
(45) Date of Patent: Nov. 14, 2017

(54) USER TERMINAL, RADIO BASE STATION AND RADIO COMMUNICATION METHOD

(71) Applicant: NTT DOCOMO, INC., Tokyo (JP)

(72) Inventors: Satoshi Nagata, Tokyo (JP); Kazuki Takeda, Tokyo (JP); Chunyi Wang, Beijing (CN); Xiaolin Hou, Beijing (CN); Atsushi Harada, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 29 days.

(21) Appl. No.: 14/893,321

(22) PCT Filed: Apr. 17, 2014

(86) PCT No.: PCT/JP2014/060892
§ 371 (c)(1),
(2) Date: Nov. 23, 2015

(87) PCT Pub. No.: WO2014/192453
PCT Pub. Date: Dec. 4, 2014

(65) Prior Publication Data
US 2016/0099801 A1    Apr. 7, 2016

(30) Foreign Application Priority Data

May 27, 2013   (JP) ................................. 2013-111255

(51) Int. Cl.
*H04J 3/00*        (2006.01)
*H04L 5/14*        (2006.01)
(Continued)

(52) U.S. Cl.
CPC .................. *H04L 5/14* (2013.01); *H04L 1/12* (2013.01); *H04L 5/0053* (2013.01); *H04W 72/0446* (2013.01); *H04L 5/0007* (2013.01)

(58) Field of Classification Search
CPC ........... H04L 5/14; H04L 1/12; H04L 5/0053; H04W 72/0446
See application file for complete search history.

(56) References Cited

U.S. PATENT DOCUMENTS 9,179,445 B2 * 11/2015 Wang ..................... H04W 72/04
9,306,721 B2 *  4/2016 Jung ..................... H04L 5/0055
(Continued)

OTHER PUBLICATIONS

U.S. Appl. No. 61/780,227 Provisional Specification.*
(Continued)

*Primary Examiner* — Siren Wei
(74) *Attorney, Agent, or Firm* — Osha Liang LLP

(57) ABSTRACT

The present invention is designed to feed back feedback signals such as delivery acknowledgement signals properly even when the DL/UL configuration is reconfigured in TDD. A user terminal communicates, in time division duplexing, with a radio base station that reconfigures the DL/UL configuration, and has a judging section that judges a delivery acknowledgement in response to each DL subframe, and a feedback control section that allocates a delivery acknowledgement signal in response to each DL subframe to a UL subframe and sends feedback, and, when the number of DL subframes that correspond to a UL subframe is greater than a predetermined value in a radio frame after the reconfiguration of the DL/UL configuration, the feedback control section bundles at least part of the delivery acknowledgement signals for a plurality of DL subframes corresponding to the UL subframe, and sends feedback.

7 Claims, 14 Drawing Sheets

(51) Int. Cl.
*H04L 5/00* (2006.01)
*H04W 72/04* (2009.01)
*H04L 1/12* (2006.01)

(56) References Cited

U.S. PATENT DOCUMENTS

| | | | |
|---|---|---|---|
| 2009/0285122 A1* | 11/2009 | Onggosanusi | H04L 1/1607 370/254 |
| 2012/0033648 A1* | 2/2012 | Papasakellariou | H04L 1/003 370/336 |
| 2014/0269452 A1* | 9/2014 | Papasakellariou | H04B 7/2643 370/280 |

OTHER PUBLICATIONS

3GPP TSG-RAN WG1 #63, Nov. 15-19, 2010, R1-105983.*
International Search Report issued in PCT/JP2014/060892 dated Jul. 22, 2014 (1 page).

NTT DoCoMo; "HARQ Design for eIMTA"; 3GPP TSG RAN WG1 Meeting #72bis, R1-131419; Chicago, USA; Apr. 15-19, 2013 (5 pages).

Alcatel-Lucent et al.; "Remaining Issues for A/N transmission on PUCCH for TDD"; 3GPP TSG-RAN WG1 #63, R1-105983; Jacksonville, USA; Nov. 15-19, 2010 (4 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

Office Action issued in the counterpart Japanese Patent Application No. 2013-111255, dated May 2, 2017 (11 pages).

* cited by examiner

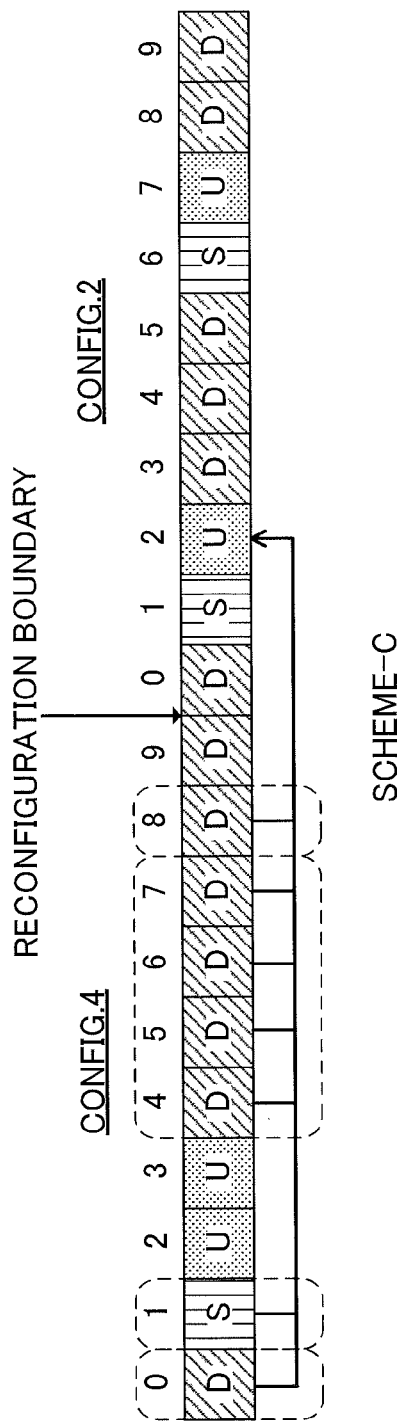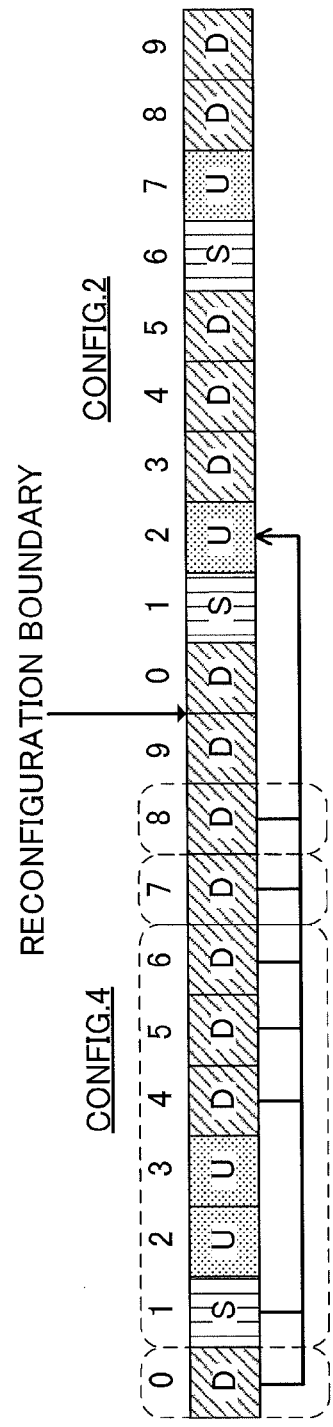
FIG.8A
FIG.8B

USER TERMINAL, RADIO BASE STATION AND RADIO COMMUNICATION METHOD

TECHNICAL FIELD

The present invention relates to a user terminal, a radio base station and a radio communication method that are applicable to a next-generation communication system.

BACKGROUND ART

In a UMTS (Universal Mobile Telecommunications System) network, the specifications of long-term evolution (LTE) have been drafted for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single-Carrier Frequency Division Multiple Access) is used in uplink channels (uplink). Also, successor systems of LTE (referred to as, for example, "LTE-advanced" or "LTE enhancement" (hereinafter referred to as "LTE-A")) have been under study for the purpose of achieving further broad bandization and increased speed beyond LTE, and the specifications have been drafted.

As duplexing methods in radio communication, there are frequency division duplexing (FDD) to divide between the uplink (UL) and the downlink (DL) based on frequency, and time division duplexing (TDD) to divide between the uplink and the downlink based on time. In TDD, the same frequency region is applied to uplink and downlink communication, and signals are transmitted and received to and from one transmitting/receiving point by dividing the uplink and the downlink based on time.

In TDD in the LTE system, a plurality of frame configurations (DL/UL configurations) with different transmission ratios between uplink subframes (UL subframes) and downlink subframes (DL subframes) are defined. To be more specific, as shown in FIG. 1, seven frame configurations, namely DL/UL configurations 0 to 6, are defined, where subframes #0 and #5 are allocated to the downlink and subframe #2 is allocated to the uplink. Also, in TDD, delivery acknowledgement signals (HARQ) in response to the downlink shared channel (PDSCH) that is transmitted in each DL subframe are fed back using predetermined UL subframes, which are determined on a per DL/UL configuration basis.

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

Generally speaking, the ratio between UL traffic and DL traffic is not fixed, and changes over time or between locations. Consequently, when TDD is employed, from the perspective of allowing effective use of radio resources, the DL/UL configurations shown in FIG. 1 are preferably switched around over time or between locations, in accordance with the actual variation of traffic, rather than fixed.

So, in TDD of the LTE-A system (Rel. 12) and later systems, a study is in progress to change the transmission ratio of DL subframes and UL subframes dynamically or semi-statically in the time domain, per transmitting/receiving point (which may be a radio base station, cell, etc.) (dynamic time configuration scenario).

However, the existing LTE system is designed so that feedback signals (delivery acknowledgement signals and so on) that correspond to each DL subframe are transmitted in predetermined UL subframes. Consequently, when the DL/UL configuration is reconfigured and yet the feedback timing before the reconfiguration of the DL/UL configuration is applied on an as-is basis, there is a threat that delivery acknowledgement signals and so on cannot be transmitted properly in the radio frame after the reconfiguration of the DL/UL configuration.

The present invention has been made in view of the above, and it is therefore an object of the present invention to provide a user terminal, a radio base station and a radio communication method, whereby, even when the DL/UL configuration is reconfigured in TDD, feedback signals such as delivery acknowledgement signals can be fed back properly.

Solution to Problem

A user terminal, according to the present invention, is a user terminal that communicates in time division duplexing with a radio base station that reconfigures a DL/UL configuration, and that has a judging section that judges a delivery acknowledgement in response to each DL subframe, and a feedback control section that allocates a delivery acknowledgement signal in response to each DL subframe to a UL subframe and sends feedback, and, in this user terminal, when the number of DL subframes that correspond to a UL subframe is greater than a predetermined value in a radio frame after the reconfiguration of the DL/UL configuration, the feedback control section bundles at least part of delivery acknowledgement signals for a plurality of DL subframes corresponding to the UL subframe, and sends feedback.

Advantageous Effects of Invention

According to the present invention, even when the DL/UL configuration is reconfigured in TDD, feedback signals such as delivery acknowledgement signals can be fed back properly.

BRIEF DESCRIPTION OF DRAWINGS

FIG. 8 provides diagrams to explain another example of a feedback method of delivery acknowledgement signals for each DL subframe before the DL/UL configuration is reconfigured, in accordance with a reconfiguration of the DL/UL configuration;

DESCRIPTION OF EMBODIMENTS

First, the method of feeding back a delivery acknowledgement signal (also referred to as "HARQ-ACK" or "ACK/NACK") in response to a downlink data signal (PDSCH signal) via the PUCCH of a predetermined uplink subframe in time division duplexing (TDD) will be described with reference to FIG. 2.

Figure 2A:
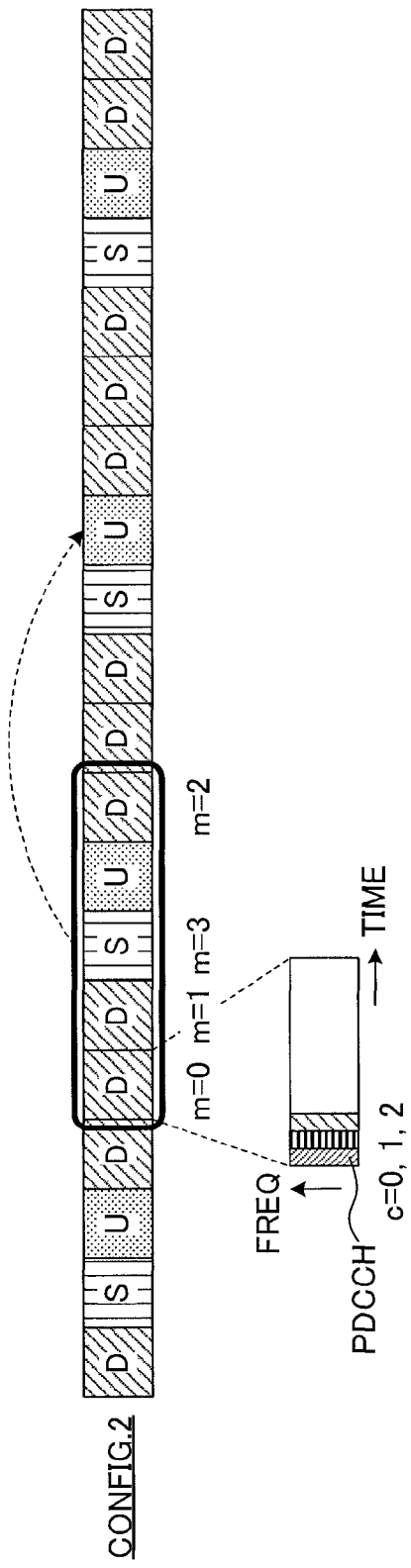
FIG. 2 provides diagrams to explain a method of allocating PUCCH resources that correspond to each DL subframe in TDD.
Figure 2B:
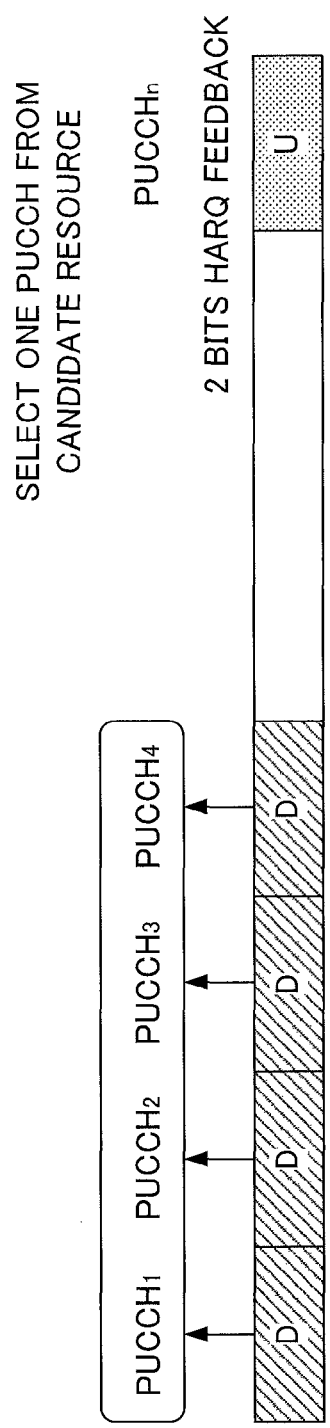

FIG. 2A shows a radio frame structure in TDD (DL/UL configuration 2). Also, FIG. 2B shows a schematic diagram of a case where channel selection based on the PUCCH format is applied to delivery acknowledgement signals in response to a plurality of DL subframes.

FIG. 2A show a case where the delivery acknowledgement signals in response to the downlink data signals of the DL subframes and special subframe (hereinafter also referred to simply as "DL subframes"), which are the fifth to the ninth from the left, are allocated to and fed back in the PUCCH of the UL subframe that comes thirteenth from the left. The special subframe that comes seventh from the left has a guard interval that is necessary to switch between the uplink and the downlink, so that the PDSCH, the PUSCH and so on are allocated via this guard interval. In FIG. 2A, the number of subframes to feed back is four (M=4), so that the indices of the constituent subframes are m=0, 1, 2, 3. Note that, in FIG. 2A, the indices of m are assigned to the DL subframes preferentially over the special subframes, so that the fifth subframe from the left is m=0, the sixth subframe is m=1, the seventh subframe is m=3 and the ninth subframe is m=2. Note that the method of numbering the subframe indices m is by no means limited to this. Note that the following description will be given assuming that special subframes are DL subframes.

Delivery acknowledgement signals in response to each DL subframe can be generated in one bit apiece (ACK/NACK). Consequently, to feed back delivery acknowledgement signals for four DL subframes in one UL subframe, four bits are necessary. In the existing LTE system (Rel. 10), four bits to combine two bits (QPSK) by PUCCH format 1b and two bits by channel selection of the PUCCH resource (channel) corresponding to each DL subframe are used (see FIG. 2B).

The PUCCH resource to correspond to each DL subframe can be determined based on the control channel element (CCE) of the downlink control signal (PDCCH) transmitted in each DL subframe, and so on. For example, as shown in FIG. 2A, when delivery acknowledgement signals for a plurality of DL subframes are fed back via a predetermined UL subframe, the PUCCH resource (channel) to correspond to each DL subframe can be determined using following equation 1:

$$n^{(1)}_{PUCCH,m} = (M-m-1) \times N_c + m \times N_{c+1} + n_{CCE,m} + N^{(1)}_{PUCCH} \quad \text{(Equation 1)}$$

where $N_c = \max\{0, \lfloor \lfloor N_{RB}^{DL} \times (N_{SC}^{RB} \times c - 4) \rfloor / 36 \rfloor\}$;

c: value selected from $\{0, 1, 2, 3\}$ to satisfy $N_c \leq n_{CCE,m} \leq N_{c+1}$;

$N_{RB}^{DL}$: the number of resource blocks on the downlink;

$N_{SC}^{RB}$: the number of subcarriers in the frequency direction per resource block;

M: the number of subframes for which retransmission control signals are fed back;

m: the index of subframe for which retransmission control signal is fed back (m=0 to M−1);

$n_{CCE,m}$: the first CCE index to constitute downlink control information; and $N^{(1)}_{PUCCH}$: parameter reported in higher layer signaling.

In channel selection based on PUCCH format 1b (PUCCH format 1b with channel selection), information represented in QPSK (two bits) and selection information (maximum two bits) of the PUCCH resource (channel) that is reserved in association with each DL subframe are combined and used. For example, in FIG. 2A (M=4), by using maximum four bits, which combine the PUCCH resources ($n_{PUCCH,0}$ to $n_{PUCCH,3}$) to correspond to four DL subframes and information represented in QPSK (see FIG. 2B), the delivery acknowledgement signals in response to each DL subframe are fed back.

In this way, in PUCCH format 1b with channel selection (hereinafter also referred to simply as "channel selection"), maximum four bits of delivery acknowledgement signals can be supported. When the DL/UL configurations is not reconfigured, the number of DL subframes to correspond to one UL subframe becomes four or less, except for DL/UL configuration 5 shown in above FIG. 1. Consequently, the delivery acknowledgement signals to be fed back in one UL subframe becomes four bits or less, except for DL/UL configuration 5. Consequently, in conventional systems (Rel. 10 and so on), in DL/UL configurations besides DL/UL configuration 5, delivery acknowledgement signals are fed back by employing channel selection (in DL/UL configuration 5, channel selection is not employed).

Now, as noted earlier, in Rel. 12 and later, a study is in progress to change the transmission ratio of DL subframes and UL subframes, on a per transmitting/receiving point basis, in the time domain (dynamic time configuration scenario). Now, an example of a radio communication system to reconfigure the DL/UL configuration will be described below with reference to FIG. 3A. The radio communication system shown in FIG. 3A is formed with a plurality of transmitting/receiving points (here, radio base stations #1 and #2) and user terminals #1 and #2 that communicate with radio base stations #1 and #2.

Figure 3A:
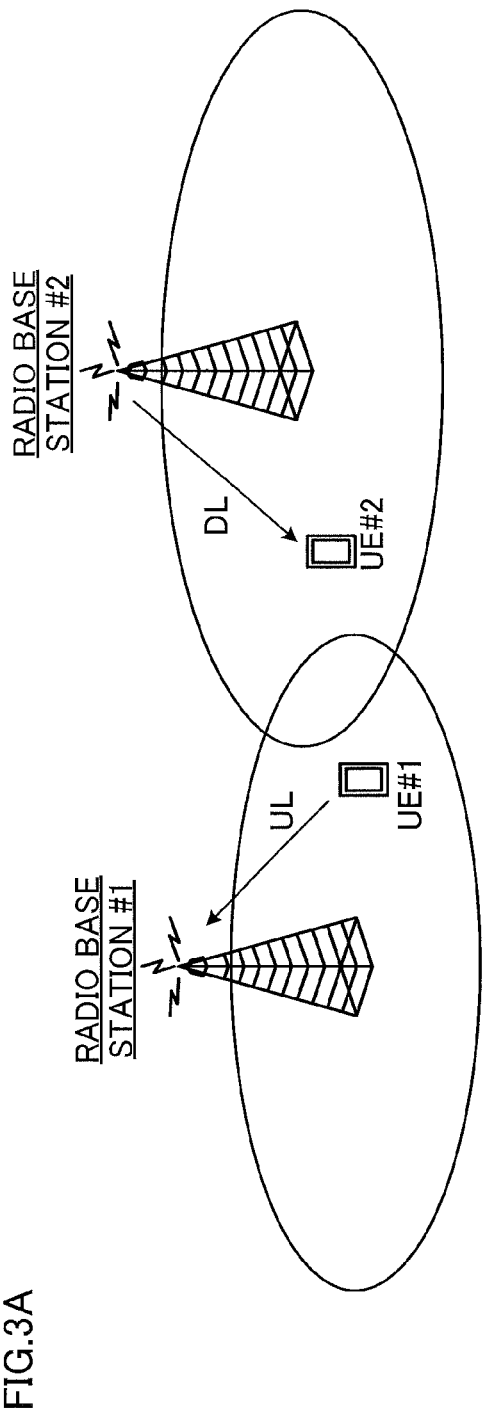
FIG. 3 provides diagrams to show an example of a radio communication system to control the DL/UL configuration separately between neighboring radio base stations.

In FIG. 3A, between radio base station #1 and user terminal #1 and between radio base station #2 and user terminal #2, radio communication is carried out by time division duplexing (TDD). That is, radio base stations #1 and #2 employ the same frequency regions for DL and UL transmission, and carry out transmission by dividing between DL and UL in the time domain.

Figure 3B:
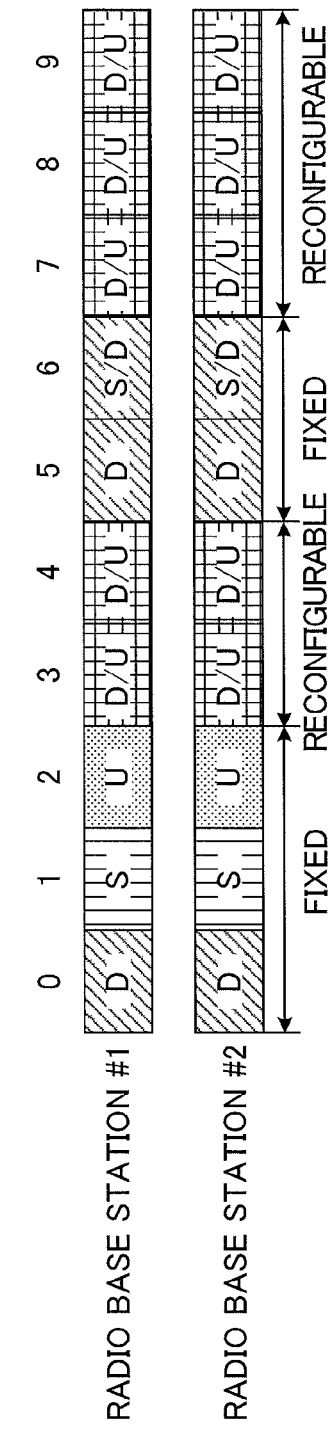

A case will be assumed here where each radio base station reconfigures between the DL/UL configurations defined in LTE Rel. 10 (DL/UL configurations 0 to 6 shown in above FIG. 1) in accordance with traffic, the number of user terminals and so on. In this case, subframes 0, 1, 2, 5 and 6 are common between DL/UL configurations 0 to 6, so that the direction of transmission varies between subframes 3, 4, 7, 8 and 9 (see FIG. 3B).

Figure 4A:
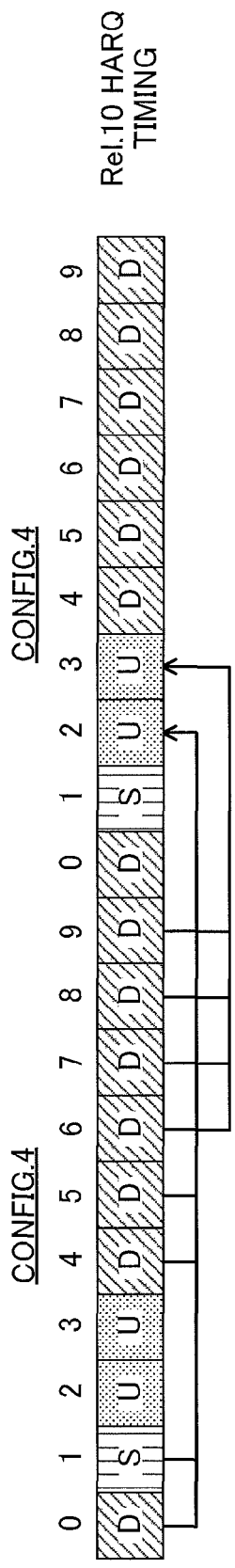
FIG. 4 provides diagrams to show an example case of reconfiguring the DL/UL configuration.
Figure 4B:
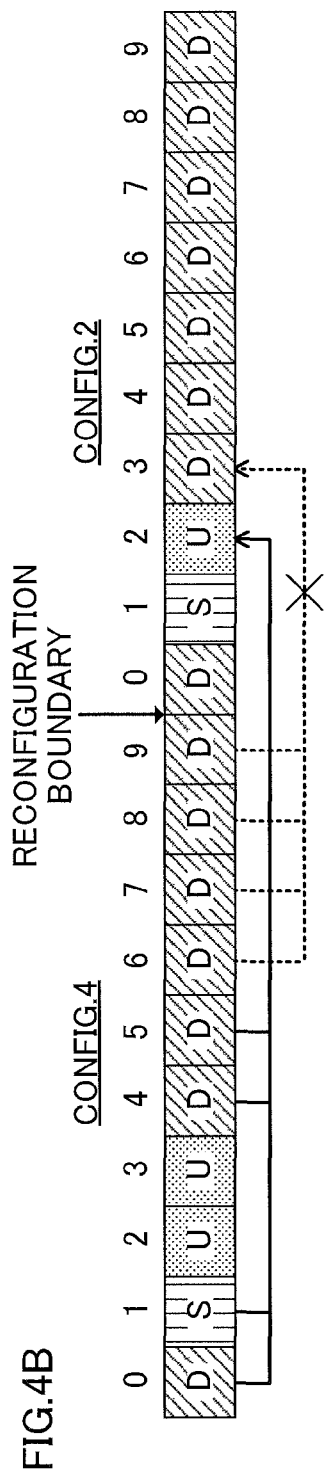

Next, a case will be described with reference to FIG. 4 where a radio base station reconfigures DL/UL configuration 4 to DL/UL configuration 2.

When the DL/UL configuration is not reconfigured (see FIG. 4A), the delivery acknowledgement signals in response to each PDSCH signal transmitted in subframes 0, 1, 4 and 5 are transmitted in the next frame, namely subframe 2. Also, the delivery acknowledgement signals in response to each PDSCH signal transmitted in subframes 6 to 9 are fed back in the next frame, namely subframe 3.

However, when the DL/UL configuration is reconfigured (see FIG. 4B), the third subframe in DL/UL configuration 2 after the reconfiguration is a DL subframe. That is, in accordance with the reconfiguration of the DL/UL configuration, the direction of transmission in the third subframe changes from UL to DL. As a result of this, a user terminal becomes unable to feed back the delivery acknowledgement signals that correspond to DL subframes 6 to 9 in DL/UL configuration 4.

In this way, when the DL/UL configuration is reconfigured and yet the delivery acknowledgement signal feedback mechanism in Rel. 10 is applied on an as-is basis, this raises a problem when delivery acknowledgement signal and so on are fed back. So, a study is in progress to change the feedback mechanism of delivery acknowledgement signals for each DL subframe when the DL/UL configuration is reconfigured.

For example, there is a method to control the feedback mechanism based on the situation of changes of UL subframes in radio frames before and after the DL/UL configuration is reconfigured. In this case, in radio frames before and after a reconfiguration of the DL/UL configuration, the delivery acknowledgement signals of DL subframes corresponding to the subframes where the direction of transmission stays unchanged from UL are fed back using conventional feedback mechanism. On the other hand, delivery acknowledgement signals for DL subframes corresponding to the subframes where the direction of transmission is changed from UL to DL select a reference DL/UL configuration (reference time configuration) to serve as the basis, and use the feedback mechanism of this DL/UL configuration.

Figure 5A:
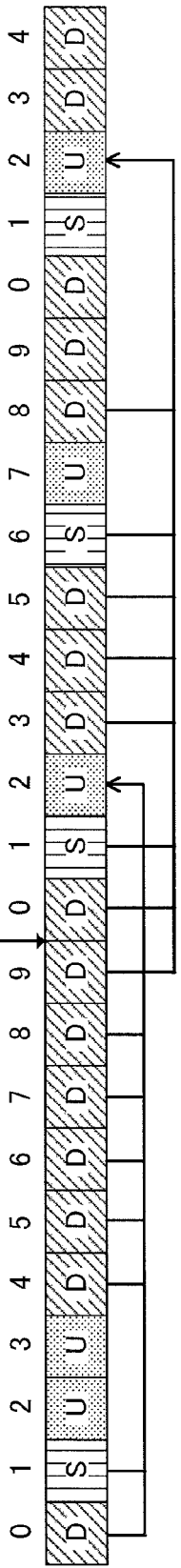
FIG. 5 provides diagrams to show an example of changing the feedback mechanism of uplink control signals of each DL subframe in response to a reconfiguration of the DL/UL configuration.
Figure 5B:
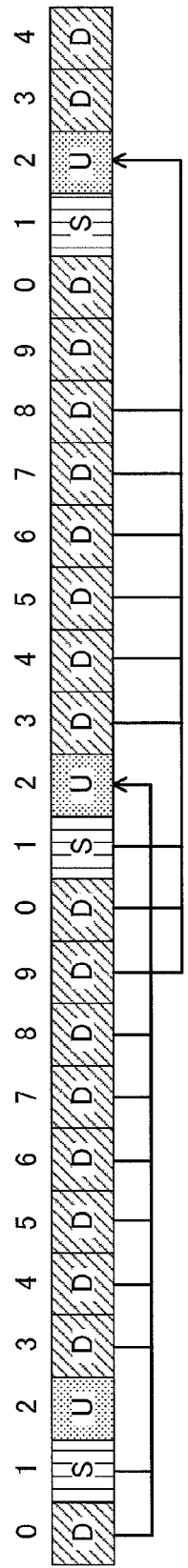

The reference DL/UL configuration can be selected depending on the situation of changes of UL subframes in radio frames before and after the reconfiguration of the DL/UL configuration. In FIG. 5A, in the radio frames before and after the reconfiguration of the DL/UL configuration, the subframe where the direction of transmission stays unchanged from UL is UL subframe 2. Consequently, DL/UL configuration 5, in which a UL subframe is set in subframe 2 alone (see FIG. 5B), is selected as the reference DL/UL configuration. As a result of this, in FIG. 5A, the delivery acknowledgement signals of DL subframes 0, 1 and 4 to 8 in the radio frame before the reconfiguration of the DL/UL configuration are fed back in UL subframe 2 in the radio frame after the reconfiguration of the DL/UL configuration.

Figure 5C:
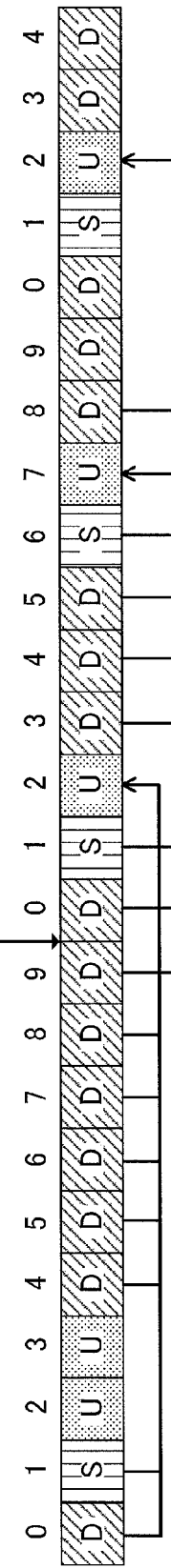

Also, as another delivery acknowledgement signal feedback mechanism, the method of using the nearest UL subframe that comes four subframes or more after each DL subframe, even when the DL/UL configuration is reconfigured, is possible (see FIG. 5C). In FIG. 5C, the delivery acknowledgement signals of DL subframes 0, 1 and 4 to 8 in the radio frame before the reconfiguration of the DL/UL configuration are fed back in UL subframe 2 in the radio frame after the reconfiguration of the DL/UL configuration.

In this way, a study is in progress to change the HARQ feedback mechanism for each DL subframe in accordance with a reconfiguration of the DL/UL configuration. However, when the feedback mechanism is changed, there is a threat that the number of DL subframes to correspond to one UL subframe becomes greater than four. For example, in the case illustrated in FIGS. 5A and 5C, it is necessary to feed back the delivery acknowledgement signals for seven DL subframes 0, 1 and 4 to 8 by using UL subframe 2 in the radio frame shortly after a reconfiguration of the DL/UL configuration.

In this case, if more than four DL subframe correspond to the UL subframe and the delivery acknowledgement signals for the DL subframes are generated in one bit apiece, a problem arises that above-described PUCCH format 1b with channel selection cannot provide sufficient support (bit mapping problem). Also, in channel selection, maximum four PUCCH resources (channels) need to be reserved. However, when more than four DL subframes correspond to one UL subframe, a problem arises that the number of PUCCH resources to reserve becomes greater than four, and the efficiency of the use of resources decreases (PUCCH resource allocation problem).

Figure 1:
FIG. 1 is a diagram to explain examples of DL/UL configurations in TDD.

Note that, considering the seven types of DL/UL configurations shown in above FIG. 1, forty-two (7×6) patterns to reconfigure the DL/UL configuration may be possible. Also, when the feedback mechanism shown in above FIG. 5A is employed in accordance with a reconfiguration of the DL/UL configuration, there may be twelve patterns in which the number of DL subframes to correspond to one UL subframe becomes greater than four. Furthermore, when different feedback mechanisms from the one shown in above FIG. 5A are employed, cases might occur where the number of DL subframes to correspond to one UL subframe becomes greater than four. In this way, when the number of DL subframes that correspond to a UL subframe becomes greater than a predetermined value (here, four) due to a reconfiguration of the DL/UL configuration, it is difficult to send feedback by employing conventional channel selection.

As a method of solving this problem, it is possible to employ a different PUCCH format (for example, PUCCH format 3, in which the number of bits that can be transmitted is large). PUCCH format 3 is a PUCCH format that is defined anew in LTE-A, and can transmit many ACK/NACK bits (20 bits). In PUCCH format 3, similar to the PUSCH, signals are generated by way of DFT (Discrete Fourier Transform)-based pre-coding, so that it is possible to multiplex varying UEs by means of orthogonal code (OCC: Orthogonal Cover Code).

Also, when PUCCH format 3 is employed, as the resources to allocate the delivery acknowledgement signals to, PUCCH resource candidates are reported to a user terminal by means of RRC signaling, and indicators (ARIs:

A/N Resource Indicators) to represent specific PUCCH resource candidates are included in downlink control information and reported.

However, when PUCCH format 3 is employed, by contrast with the case of employing PUCCH format 1b, a problem with decreased reliability of PUCCH transmission, a problem with increased signaling overhead and so on arise. Also, it is also possible to change the PUCCH format to employ, depending on the number of DL subframes that correspond to a UL subframe. However, the PUCCH format which a user terminal employs is reported through higher layer signaling (for example, RRC signaling), so that it is difficult to change between varying PUCCH formats dynamically.

So, the present inventors have come up with the idea of grouping (bundling) at least part of the delivery acknowledgement signals for a plurality of DL subframes and sending feedback, depending on the number of DL subframes that correspond to a UL subframe, in the radio frame after a reconfiguration of the DL/UL configuration. To be more specific, the present inventors have found out bundling at least part of the delivery acknowledgement signals for a plurality of DL subframes into a predetermined number of bits (for example, four bits) when the number of DL subframes to correspond to a UL subframe is greater than a predetermined value.

By this means, even when the DL/UL configuration is reconfigured and the number of DL subframes to correspond to one UL subframe becomes greater than four, it is still possible to employ the same PUCCH format (for example, channel selection based on PUCCH format 1b) and send feedback. Furthermore, the present inventors have found out a new method of selecting the PUCCH resource to use in channel selection when at least part of the delivery acknowledgement signals for a plurality of DL subframes is bundled and channel selection is employed.

Now, the present embodiment will be described below in detail with reference to the accompanying drawings. Note that, although the configurations defined in LTE Rel. 10 (see FIG. 1) will be described as examples of DL/UL configurations in the following description, the DL/UL configurations that are applicable to the present embodiment are by no means limited to these. Also, although the method shown in above FIG. 5A will be described as an example of feedback mechanism to use when the DL/UL configuration is reconfigured, this is by no means limiting. The present embodiment is applicable as long as the number of DL subframes that correspond to a UL subframe becomes greater than a predetermined value (for example, four) following a reconfiguration of the DL/UL configuration.

<Bit Mapping>

With the present embodiment, in the radio frame after a reconfiguration of the DL/UL configuration, depending on the number of DL subframes that correspond to a UL subframe, at least part of the acknowledgement signals for a plurality of DL subframes that correspond to the UL subframe is grouped (bundled) and fed back. Note that the number of DL subframes that correspond to a UL subframe refers to the number of DL subframes in response to which PDSCH delivery acknowledgement signals are fed back using this UL subframe.

For example, in the radio frame after a reconfiguration of the DL/UL configuration, a user terminal judges whether the number of DL subframes that correspond to a UL subframe, M, is equal to or less than a predetermined value (for example, four), and controls whether or not to bundle the delivery acknowledgement signals. The number of DL subframes that correspond to each UL subframe can be judged based on information regarding the DL/UL configuration reporting from the radio base station, the feedback mechanism to use when the DL/UL configuration is reconfigured, and so on. Note that the radio frame after a reconfiguration of the DL/UL configuration is not limited to the radio frame shortly after the DL/UL configuration is reconfigured, and may include the next frame as well.

When the number M of DL subframes that correspond to a UL subframe is equal to or less than a predetermined value (for example, M≤4), the user terminal uses the conventional step of bit mapping (LTE Rel. 10). That is, the user terminal applies conventional PUCCH format 1b with channel selection, and feeds back the delivery acknowledgement signal of each DL subframe.

On the other hand, when the number M of DL subframes that correspond to a UL subframe is greater than a predetermined value (for example, M>4), the user terminal bundles at least part of the delivery acknowledgement signals among the delivery acknowledgement signals for a plurality of DL subframes that correspond to the UL subframe into a predetermined number of bits (for example, four bits).

Here, bundling at least part of the delivery acknowledgement signals among the delivery acknowledgement signals for a plurality of DL subframes refers to bundling the delivery acknowledgement signals for part of the DL subframes together. That is to say, this does not include bundling the delivery acknowledgement signals of all DL subframes together into one bit. Now, the feedback method when DL/UL configuration 4 is reconfigured to DL/UL configuration 2 will be described in detail with reference to FIG. 6.

Figure 6A:
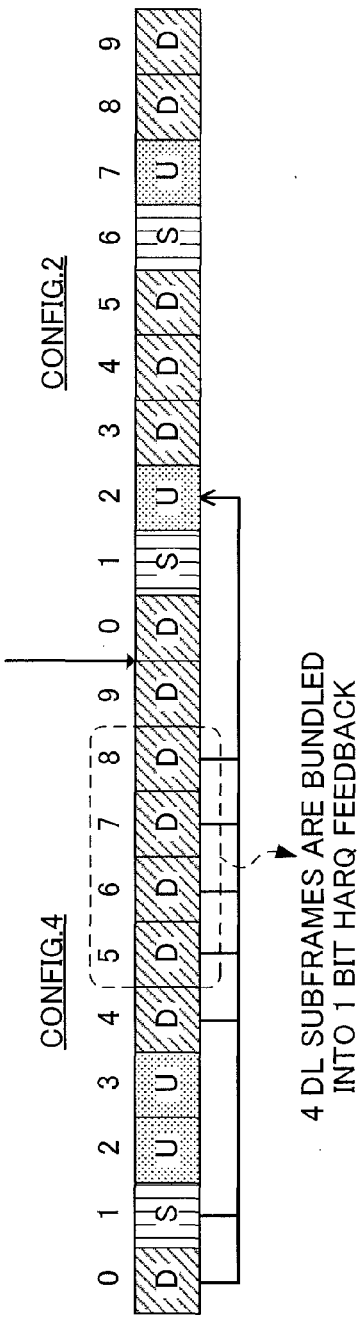
FIG. 6 provides diagrams to explain an example of a feedback method of delivery acknowledgement signals for each DL subframe before the DL/UL configuration is reconfigured, in accordance with a reconfiguration of the DL/UL configuration.
Figure 6B:
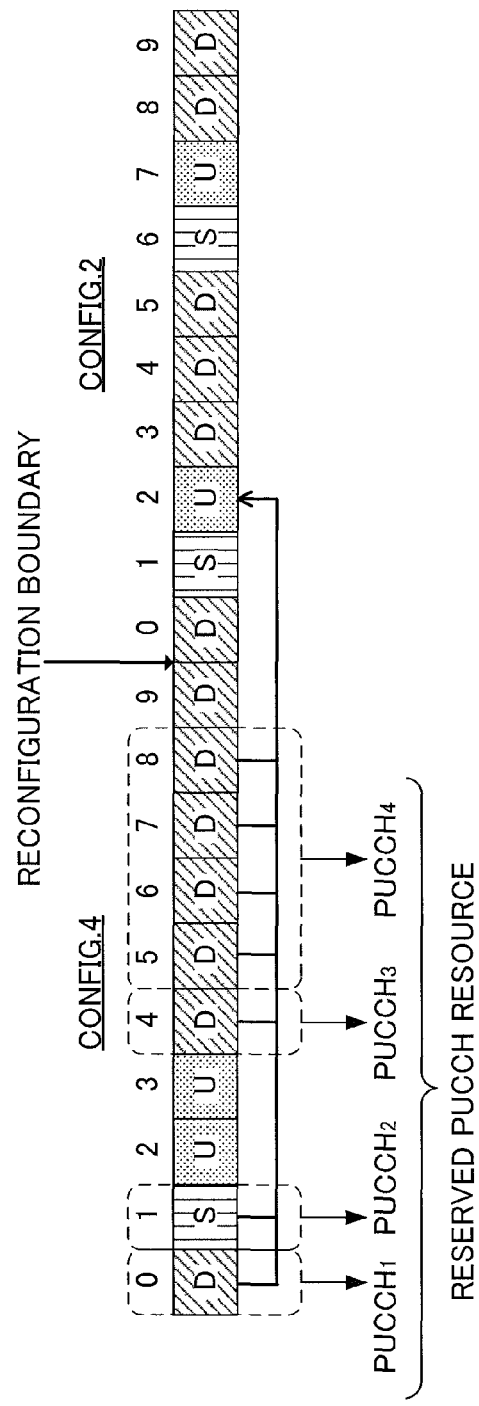

FIG. 6A shows a case where the feedback mechanism shown in above FIG. 5A is applied when the DL/UL configuration is reconfigured. In this case, DL subframes 0, 1 and 4 to 8 in the radio frame before the reconfiguration of the DL/UL configuration correspond to UL subframe 2 in the radio frame after the reconfiguration of the DL/UL configuration. That is, the number M of DL subframes to correspond to UL subframe 2 becomes seven (M>4), so that the user terminal bundles part of the respective delivery acknowledgement signals in response to DL subframes 0, 1 and 4 to 8 into a predetermined number of bits (for example, four bits).

For example, to the M DL subframes that correspond to UL subframe 2 after the reconfiguration of the DL/UL configuration, the indices 0 to M−1 are assigned in order from the DL subframe that is located first in the time axis direction. Then, the delivery acknowledgement signals for three DL subframes (indices #0, #1 and #2) from the top index are generated in one bit apiece. Meanwhile, the delivery acknowledgement signals for the fourth and later DL subframes (indices #3 to #M−1) can be bundled and generated in one bit. For example, if the delivery acknowledgement signals for DL subframes 5, 6, 7, 8 are all ACKs, these may be made an "ACK," or may be made a "NACK" if one of the delivery acknowledgement signals for DL subframes 5, 6, 7, 8 is a NACK. Note that the method of bundling is not limited to the method shown in FIG. 6A.

In this way, by bundling part of the delivery acknowledgement signals for respective DL subframes into a predetermined number of bits or less depending on the number M of DL subframes that correspond to one UL subframe, it is possible to apply channel selection and send feedback regardless of the number of DL subframes M.

<PUCCH Allocation>

As noted earlier, with the present embodiment, when the number M of DL subframes that correspond to a UL subframe is greater than a predetermined value, the delivery acknowledgement signals in response to at least part of the DL subframes are bundled into a predetermined number of bits, and channel selection is applied. Meanwhile, when channel selection is applied, it is necessary to preserve the PUCCH resources to use in channel selection.

In channel selection for conventional systems, applicable PUCCH resources are reserved for every DL subframe corresponding to a UL subframe. To be more specific, based on the control channel elements (CCEs) of the downlink control signals that are transmitted separately in each DL subframe, the PUCCH resources to correspond to the respective DL subframes are reserved (above equation 1).

On the other hand, with the present embodiment, when the number M of DL subframes that correspond to a UL subframe is greater than a predetermined value (for example, four) (when bundling is carried out), PUCCH resources to correspond to part of the DL subframes selected from a plurality of DL subframes are reserved, instead of reserving PUCCH resources for all of the DL subframes that correspond to that UL subframe. By this means, it is possible to improve the efficiency of the use of radio resources.

Even when the number M of DL subframes that correspond to a UL subframe is greater than four, the user terminal selects four DL subframes out of a plurality of DL subframes. Then, using above equation 1, the user terminal reserves PUCCH resources (for example, four) to correspond to the selected DL subframes.

For example, the user terminal selects DL subframes that are not bundled and the DL subframe that is placed first in the time axis direction among the bundled DL subframes, and reserves the PUCCH resources to correspond to these DL subframes. As shown in above FIG. 6A, the delivery acknowledgement signals for DL subframes 0, 1, 4 are each generated in one bit, and, when the delivery acknowledgement signals for DL subframes 5 to 8 are bundled and generate one bit, the PUCCH resources to correspond to DL subframes 0, 1 and 4, 5 are set (see FIG. 6B).

In this way, when the number M of DL subframes that correspond to a UL subframe is greater than a predetermined value, the delivery acknowledgement signals for at least part of the DL subframes are bundled into predetermined bits, and a predetermined number of PUCCH resources are reserved. By this means, it becomes possible to use channel selection properly even when the number of DL subframes to correspond to a UL subframe increases in response to a reconfiguration of the DL/UL configuration. Also, with the present embodiment, part of the delivery acknowledgement signals for a plurality of DL subframes is bundled, and not all the delivery acknowledgement signals are bundled together into one bit, so that it is possible to reduce the resources to use in retransmission. Also, even when the number M of DL subframes to correspond to one UL subframe is greater than a predetermined value, PUCCH resources to correspond to part of the DL subframes are reserved, instead of reserving PUCCH resources to correspond to all of the DL subframes. By this means, it is possible to effectively reduce the collisions of PUCCH signals and furthermore allow effective use of resources.

<Variation>

With the present embodiment, when the number M of DL subframes that correspond to a UL subframe is greater than a predetermined value, although delivery acknowledgement signals for a plurality of DL subframes are bundled, the method of bundling (bundling scheme) is not limited to the above-described method. Now, other examples of the bundling method that are applicable to the present embodiment will be described below.

It is possible to determine the DL subframes to apply bundling to, among a plurality of DL subframes that correspond to a UL subframe, depending on the order of arrangement of each DL subframe in the time axis direction (category 1). Alternatively, it is equally possible to determine the DL subframes to bundle so that the groups of DL subframes to bundle (bundling groups) are the same or equal in size (category 2).

Figure 7A:
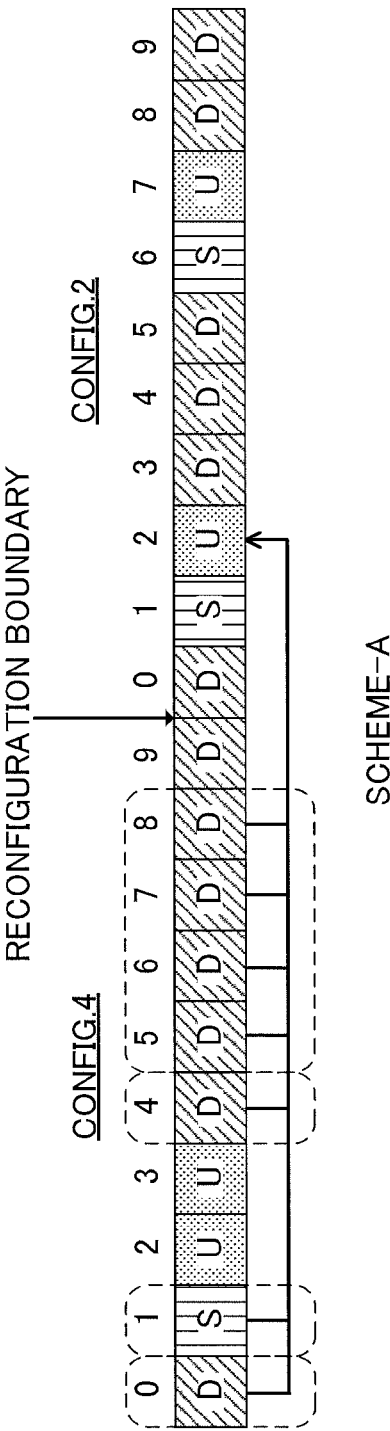
FIG. 7 provides diagrams to explain another example of a feedback method of delivery acknowledgement signals for each DL subframe before the DL/UL configuration is reconfigured, in accordance with a reconfiguration of the DL/UL configuration.

FIG. 7A shows an example in category 1 (scheme-A). In scheme-A, among a plurality of DL subframes that correspond to a UL subframe, the delivery acknowledgement signals for three DL subframes, the first to third in the time axis direction, are each generated in one bit (three bits in total). On the other hand, the delivery acknowledgement signals for the rest of the DL subframes, the fourth and later, are bundled and generated in one bit. In FIG. 7A, the delivery acknowledgement signals for DL subframes 0, 1 and 4 in the radio frame before the reconfiguration of the DL/UL configuration are each generated in one bit. Then, the delivery acknowledgement signals for DL subframes 5 to 8 are bundled and generated in one bit. Note that the bundling method in FIG. 7A is the same as that in above FIG. 6A.

In this case, it is possible to reserve the PUCCH resources to use in channel selection, based on the CCE indices of the PDCCHs that are transmitted respectively in four DL subframes 0, 1 and 4, 5, and so on. For the method of determining the PUCCH resource to correspond to each DL subframe, it is possible to use the same method as heretofore (above equation 1).

Figure 7B:
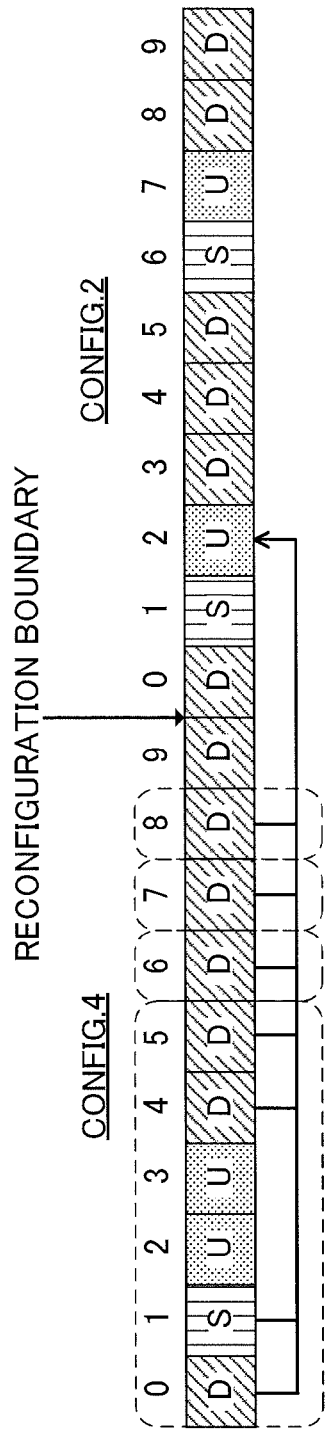

FIG. 7B shows another example in category 1 (scheme-B). In scheme-B, among a plurality of DL subframes that correspond to a UL subframe, the delivery acknowledgement signals for three DL subframes, up to the third from the last in the time axis direction, are each generated in one bit (three bits in total). Meanwhile, the delivery acknowledgement signals for the rest of the DL subframes are bundled and generated in one bit. In FIG. 7B, the delivery acknowledgement signals for DL subframes 8, 7 and 6 in the radio frame before the reconfiguration of the DL/UL configuration are each generated in one bit. Then, the delivery acknowledgement signals for DL subframes 0, 1, 4 and 5 are bundled and generated in one bit.

In this case, it is possible to reserve the PUCCH resources to use in channel selection, based on the CCE indices of the PDCCHs that are transmitted respectively in four DL subframe 0, 6, 7 and 8, and so on. That is, from a bundling group in which a plurality of DL subframes are bundled, one DL subframe (the DL subframe that is placed first in the time axis direction) can be selected.

FIG. 8A shows another example in category 1 (scheme-C). In scheme-C, among a plurality of DL subframes that correspond to a UL subframe, the delivery acknowledgement signals for three DL subframes, which are placed first, second and last in the time axis direction, are each generated in one bit (three bits in total). Meanwhile, the delivery acknowledgement signals for the other DL subframes are bundled and generated in one bit. In FIG. 8A, the delivery acknowledgement signals for DL subframes 0, 1 and 8 in the radio frame before the reconfiguration of the DL/UL configuration are each generated in one bit. Then, the delivery acknowledgement signals for DL subframes 4 to 7 are bundled and generated in one bit.

In this case, it is possible to reserve the PUCCH resources to correspond to four DL subframes 0, 1, 4 and 8, respectively. That is, from a bundling group in which a plurality of DL subframes are bundled, one DL subframe (the DL subframe that is placed first in the time axis direction) can be selected.

FIG. 8B shows another example in category 1 (scheme-D). In scheme-D, among a plurality of DL subframes that correspond to a UL subframe, the delivery acknowledgement signals for three DL subframes, which are placed first in the time axis direction, placed second from the last and placed last, are each generated in one bit (three bits in total). Meanwhile, the delivery acknowledgement signals of the other DL subframes are bundled and generated in one bit. In FIG. 8B, the delivery acknowledgement signals for DL subframes 0, 7 and 8 in the radio frame before the reconfiguration of the DL/UL configuration are each generated in one bit. Then, the delivery acknowledgement signals for DL subframes 1 and 4 to 6 are bundled and generated in one bit.

In this case, it is possible to reserve the PUCCH resources to correspond to four DL subframes 0, 1, 7 and 8, respectively. That is, from a bundling group in which a plurality of DL subframes are bundled, one DL subframe (the DL subframe that is placed first in the time axis direction) can be selected.

Figure 9A:
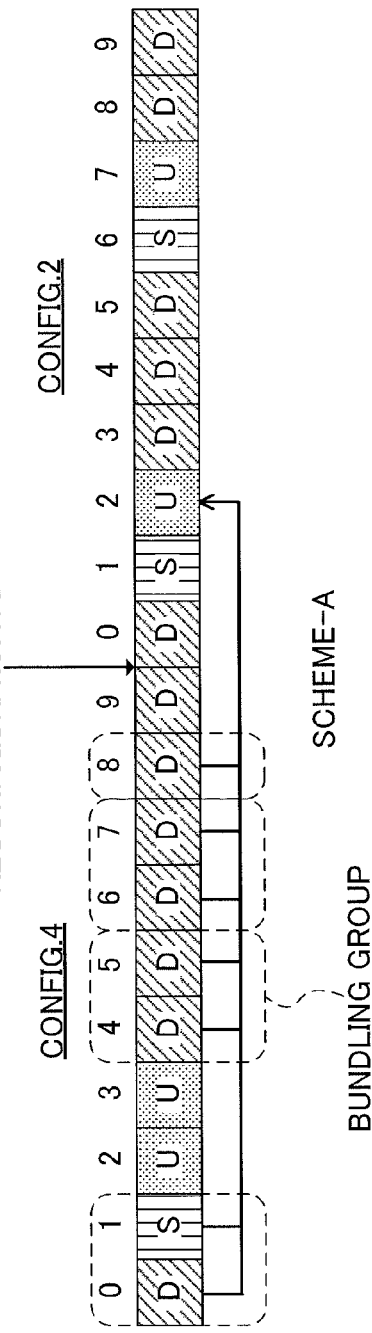
FIG. 9 provides diagrams to explain another example of a feedback method of delivery acknowledgement signals for each DL subframe before the DL/UL configuration is reconfigured, in accordance with a reconfiguration of the DL/UL configuration.

FIG. 9A shows an example in category 2 (scheme-A). In scheme-A, a plurality of DL subframes that correspond to a UL subframe are classified in four bundling groups. At this time, the bundling groups are determined so that the number of DL subframes to constitute each bundling group becomes equal.

A bundling group is the group to serve as the unit of bundling of DL subframes, and each bundling group bundles respective DL subframes. That is, the delivery acknowledgement signals for DL subframes that belong to the same bundling group are generated in one bit.

In FIG. 9A, three bundling groups each have two DL subframes, and one bundling group has one DL subframe. Also, the DL subframes to constitute each bundling group can be selected and determined in order from DL subframes that are arranged in the time axis direction. That is, depending on the size of each bundling group (the number of DL subframes), it is possible to allocate DL subframes that are arranged in the time axis direction to each bundling group in order.

In this case, the user terminal selects the DL subframe that is arranged first in the time axis direction in each bundling group, and reserve the PUCCH resources to correspond to the DL subframes that are selected from each bundling group. In FIG. 9A, four DL subframes 0, 4, 6 and 8 are selected.

Figure 9B:
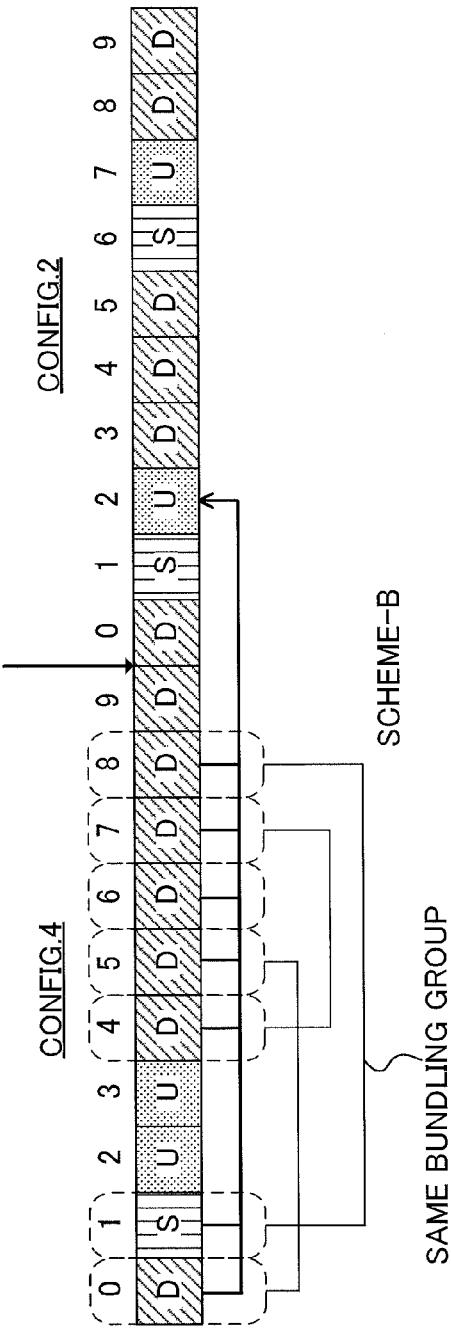

FIG. 9B shows another example in category 2 (scheme-B). In scheme-B, a plurality of DL subframes that correspond to a UL subframe are classified into four bundling groups. At this time, the bundling groups are determined so that the number of DL subframes to constitute each bundling group becomes even.

In FIG. 9B, similar to FIG. 9A, three bundling groups each have two DL subframes, and one bundling group has one DL subframe. Also, the DL subframes to constitute each bundling group can be selected and determined on a random basis. FIG. 9B show a case where DL subframes 0 and 5 constitute the same bundling group, DL subframes 1 and 8 constitute the same bundling group, and DL subframes 4 and 7 constitute the same bundling group. In this case, delivery acknowledgement signals for DL subframes that are distant in the time axis direction are bundled and generated in one bit.

Also, in FIG. 9B, again similar to FIG. 9A, it is possible to reserve PUCCH resources. For example, in FIG. 9B, it is possible to reserve PUCCH resources that correspond to four DL subframes 0, 1 and 4, 6.

(Structure of Radio Communication System)

Now, the radio communication system according to the present embodiment will be described below in detail.

Figure 10:
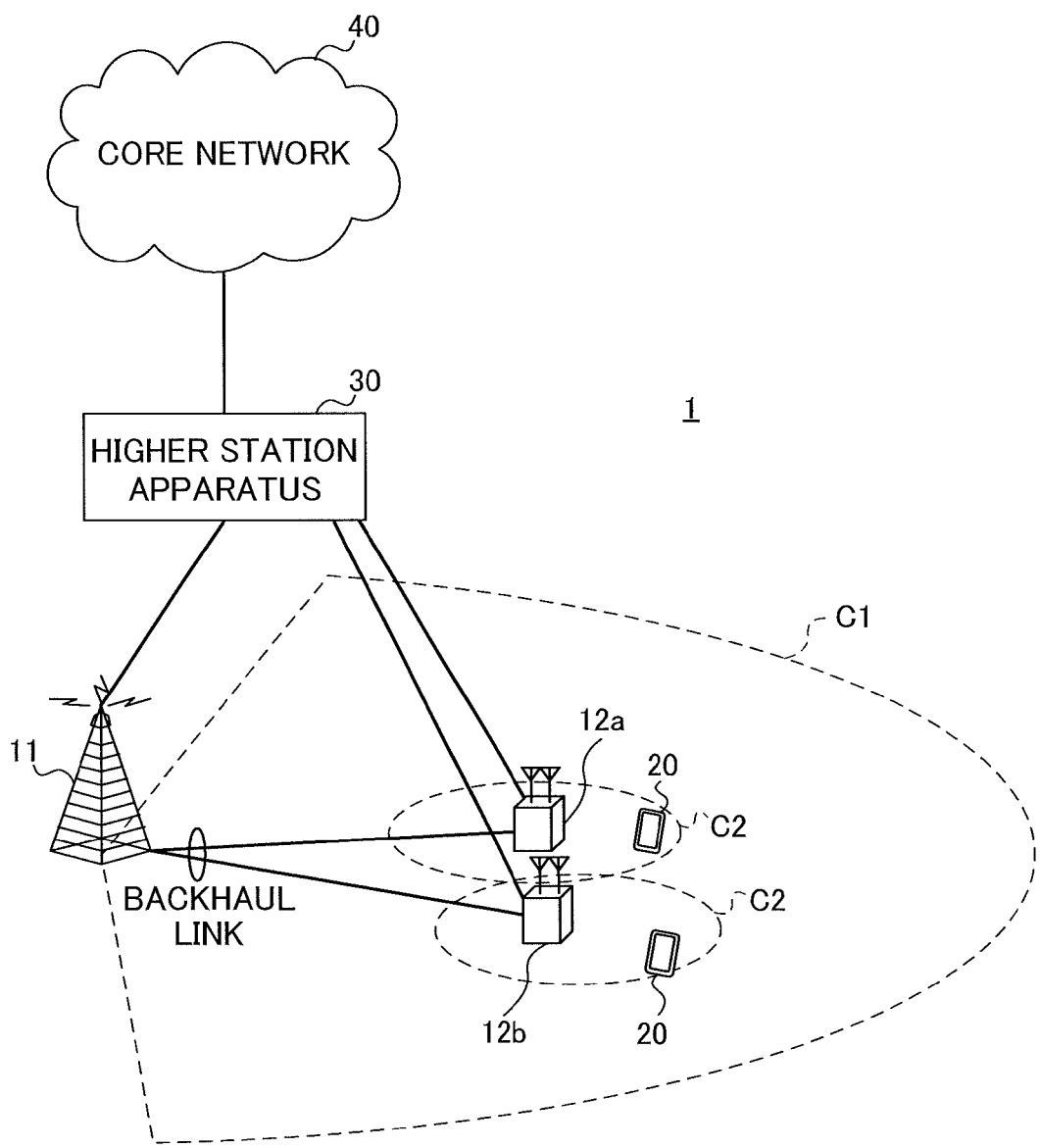
FIG. 10 is a schematic diagram to show an example of a radio communication system according to the present embodiment.

FIG. 10 is a schematic configuration diagram of a radio communication system according to the present embodiment. Note that the radio communication system shown in FIG. 10 is a system to accommodate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G" or "FRA (Future Radio Access)."

The radio communication system 1 shown in FIG. 10 includes a radio base station 11 that forms a macro cell C1, and radio base stations 12a and 12b that form small cells C2, which are placed in the macro cell C1 and which are narrower than the macro cell C1. Also, in the macro cell C1 and in each small cell C2, user terminals 20 are placed. The user terminals 20 can connect with both the radio base station 11 and the radio base stations 12 (dual connectivity). In this case, the user terminals 20 are assumed to use the macro cell C1 and the small cells C2, which use different frequencies, at the same time, by means of CA (carrier aggregation).

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz, etc.) and a wide bandwidth may be used, or the same carrier as that used in the radio base station 11 may be used. For the carrier type between the user terminals 20 and the radio base stations 12, a new carrier type (NCT) may be used. Wire connection (optical fiber, X2 interface and so on) or wireless connection is provided between the radio base station 11 and the radio base stations 12 (or between the radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "Home eNodeBs," "RRHs (Remote Radio Heads)," "micro base stations," "transmitting/receiving points" and so on. The radio base stations 11 and 12 will be hereinafter collectively referred to as a "radio base station 10," unless distinction needs to be drawn otherwise. The user terminals 20 are terminals to support various communication schemes such as LTE, LTE-A and so on, and may include both mobile communication terminals and fixed communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to reduce interference between terminals by dividing the system band into bands formed with one or continuous resource blocks, per terminal, and allowing a plurality of terminals to use mutually different bands.

Now, communication channels to be used in the radio communication system shown in FIG. 10 will be described. Downlink communication channels include a PDSCH (Physical Downlink Shared CHannel), which is used by each user terminal 20 on a shared basis, and downlink L1/L2 control channels (a PDCCH, a PCFICH, a PHICH and an enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator CHannel). HARQ ACKs/NACKs in response to the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include the PUSCH (Physical Uplink Shared Channel), which is used by each user terminal 20 on a shared basis as an uplink data channel, and the PUCCH (Physical Uplink Control CHannel), which is an uplink control channel. User data and higher control information are transmitted by this PUSCH. Also, downlink radio quality information (CQI: Channel Quality Indicator), delivery acknowledgment signals (ACKs/NACKs) and so on are transmitted by the PUCCH. Note that a case will be described with the following description where the radio base stations 12 adopt TDD.

Figure 11:
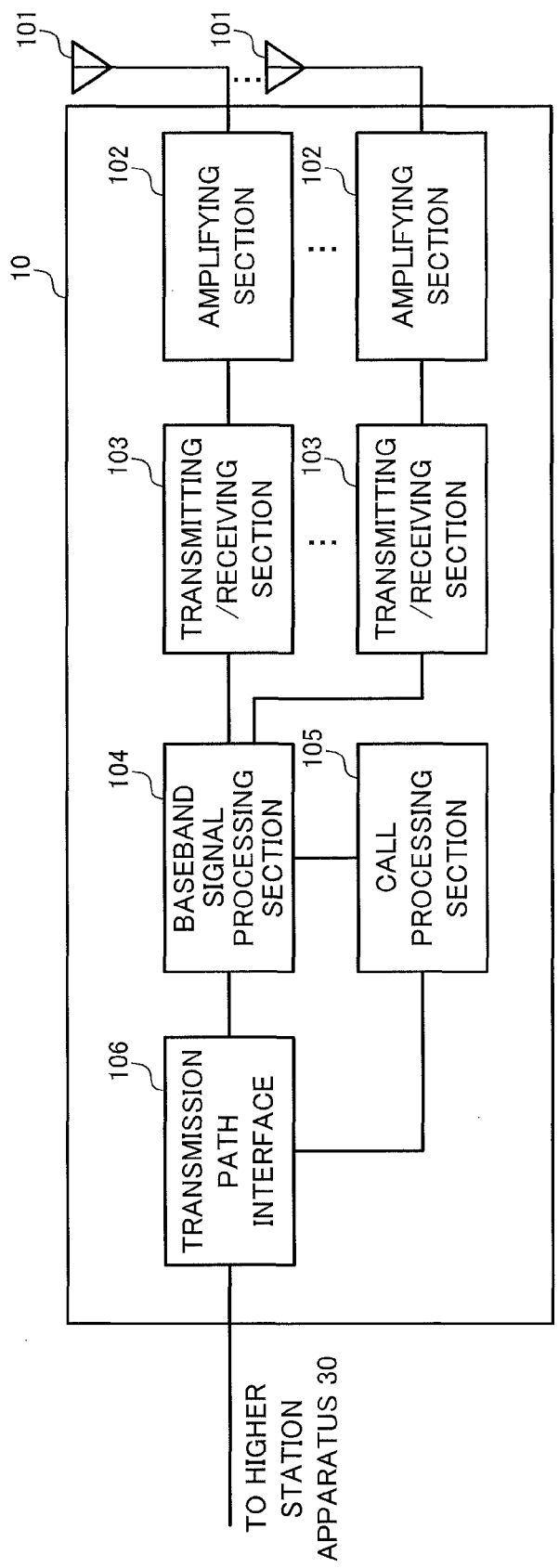
FIG. 11 is a diagram to explain an overall structure of a radio base station according to the present embodiment.

FIG. 11 is a diagram to show an overall structure of a radio base station 10 (which covers the radio base stations 11 and 12) according to the present embodiment. The radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to a user terminal 20 on the downlink is input from the higher station apparatus 30, into the baseband signal processing section 104, via the transmission path interface 106.

In the baseband signal processing section 104, a PDCP layer process, division and coupling of the user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a pre-coding process are performed, and the result is transferred to each transmitting/receiving section 103. Furthermore, downlink control channel signals are also subjected to transmission processes such as channel coding and an inverse fast Fourier transform, and are transferred to each transmitting/receiving section 103.

Also, the baseband signal processing section 104 reports, to the user terminal 20, control information for allowing communication in the cell, through higher layer signaling (for example, RRC signaling, broadcast information and so on). The information for allowing communication in the cell includes, for example, the uplink or downlink system bandwidth and so on. Also, when the DL/UL configuration is reconfigured, information related to the DL/UL configuration is reported to the user terminal 20 through higher layer signaling.

Each transmitting/receiving section 103 converts the baseband signals, which are pre-coded and output from the baseband signal processing section 104 on a per antenna basis, into a radio frequency band. The amplifying sections 102 amplify the radio frequency signals having been subjected to frequency conversion, and transmit the results through the transmitting/receiving antennas 101.

On the other hand, as for data that is transmitted from the user terminal 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input baseband signals is subjected to an FFT process, an IDFT process, error correction decoding, a MAC retransmission control receiving process and RLC layer and PDCP layer receiving processes, and the result is transferred to the higher station apparatus 30 via the transmission path interface 106. The call processing section 105 performs call processing such as setting up and releasing communication channels, manages the state of the radio base station 10 and manages the radio resources.

Figure 12:
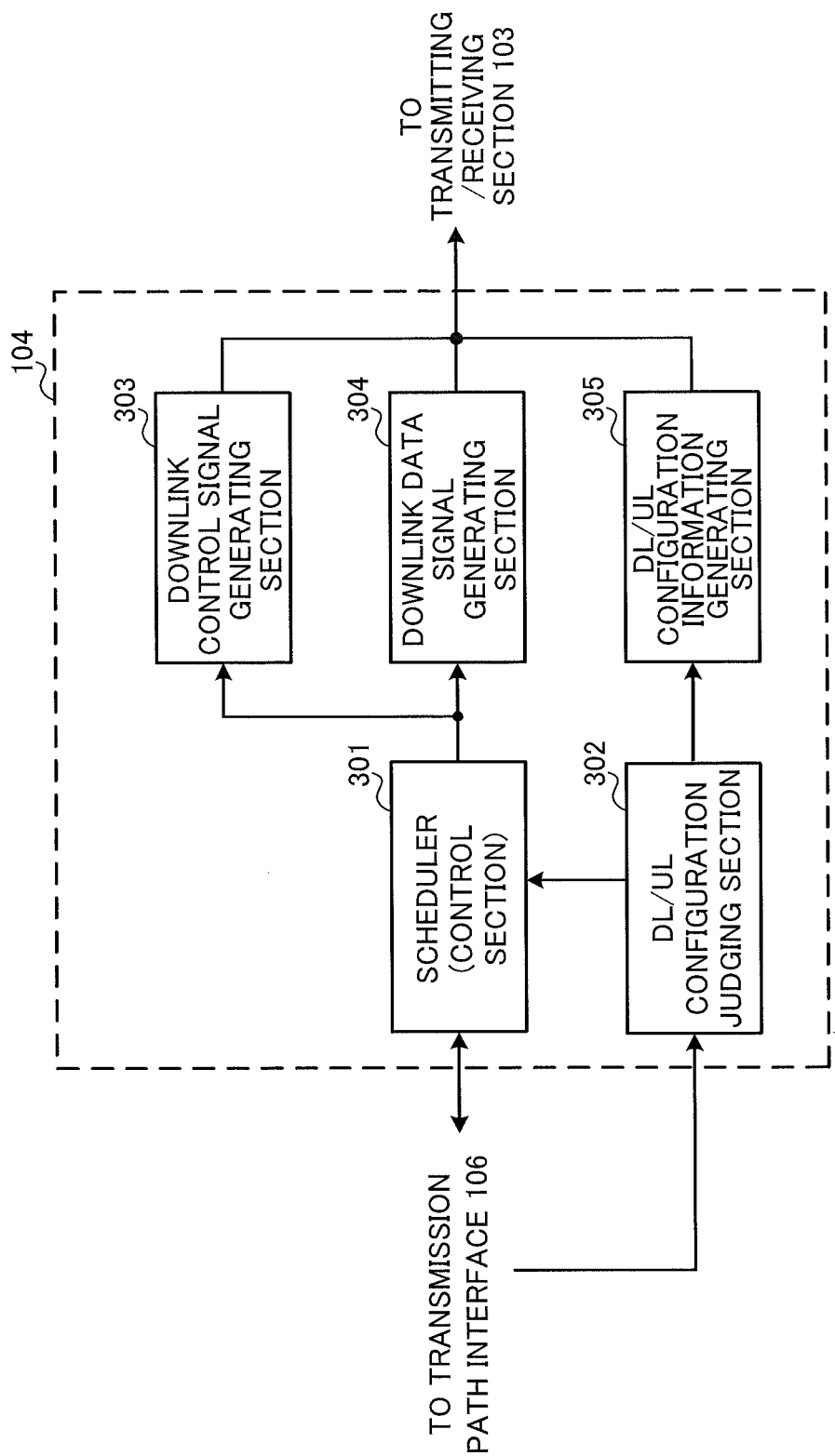
FIG. 12 is a diagram to explain a functional structure of a radio base station according to the present embodiment.

FIG. 12 is a principle functional configuration diagram of the baseband signal processing section 104 provided in a radio base station 10 (which is, for example, a radio base station 12 that serves as a small base station) according to the present embodiment. Note that, although FIG. 12 primarily shows downlink (transmitting) functional configurations, the radio base station 10 may have uplink (receiving) functional configurations as well.

As shown in FIG. 12, the baseband signal processing section 104 provided in the radio base station 12 is formed by including a scheduler (control section) 301, a DL/UL configuration judging section 302, a downlink control signal generating section 303, a downlink data signal generating section 304 and a DL/UL configuration information generating section 305.

The DL/UL configuration judging section 302 judges the DL/UL configurations which the radio base station 12 employs in TDD. For example, when the DL/UL configuration changes, the DL/UL configuration judging section 302 reports the DL/UL configuration after the reconfiguration to the scheduler 301 and the DL/UL configuration information generating section 305. Note that it is equally possible to employ a structure in which the scheduler 301 is provided with the function of the DL/UL configuration judging section 302.

The scheduler (control section) 301 controls the scheduling of the downlink data signals to be transmitted in the PDSCH, the downlink control signals to be transmitted in the PDCCH and/or the enhanced PDCCH (EPDCCH), the downlink reference signals and so on. Also, the scheduler 301 controls the scheduling (allocation control) of the uplink data to be transmitted in the PUSCH, the uplink control information to be transmitted in the PUCCH or the PUSCH and the uplink reference signals. Information about the allocation control of uplink signals (uplink control signals and uplink user data) is reported to the user terminal by using downlink control signals (DCI).

To be more specific, the scheduler 301 allocates radio resources based on command information from the higher station apparatus 30 and feedback information (for example, CSI including CQIs, RIs and so on) from each user terminal 20.

The downlink control signal generating section 303 generates downlink control signals (PDCCH signals and/or EPDCCH signals), the allocation of which is determined in the scheduler 301. To be more specific, the downlink control signal generating section 303 generates a DL assignment, which reports downlink signals allocation information, and a UL grant, which reports uplink signal allocation information, based on commands from the scheduler 301.

The downlink data signal generating section 304 generates downlink data signals (PDSCH signal), the allocation of which to resources is determined by the scheduler 301. The data signals that are generated in the data signal generating section 303 are subjected to a coding process and a modulation process, based on coding rates and modulation schemes that are determined based on CSI from each user terminal 20 and so on.

The DL/UL configuration information generating section 305 generates information regarding the DL/UL configurations employed in the system. For example, when the DL/UL configuration is reconfigured, information regarding the DL/UL configuration to be applied after the reconfiguration is generated. The information generated in the DL/UL configuration information generating section 305 may be reported to user terminal 20 by higher layer signaling (RRC signaling, broadcast signal and so on), or may be included in the downlink control signals generated in the downlink control signal generating section 303 and reported to the user terminal.

Figure 13:
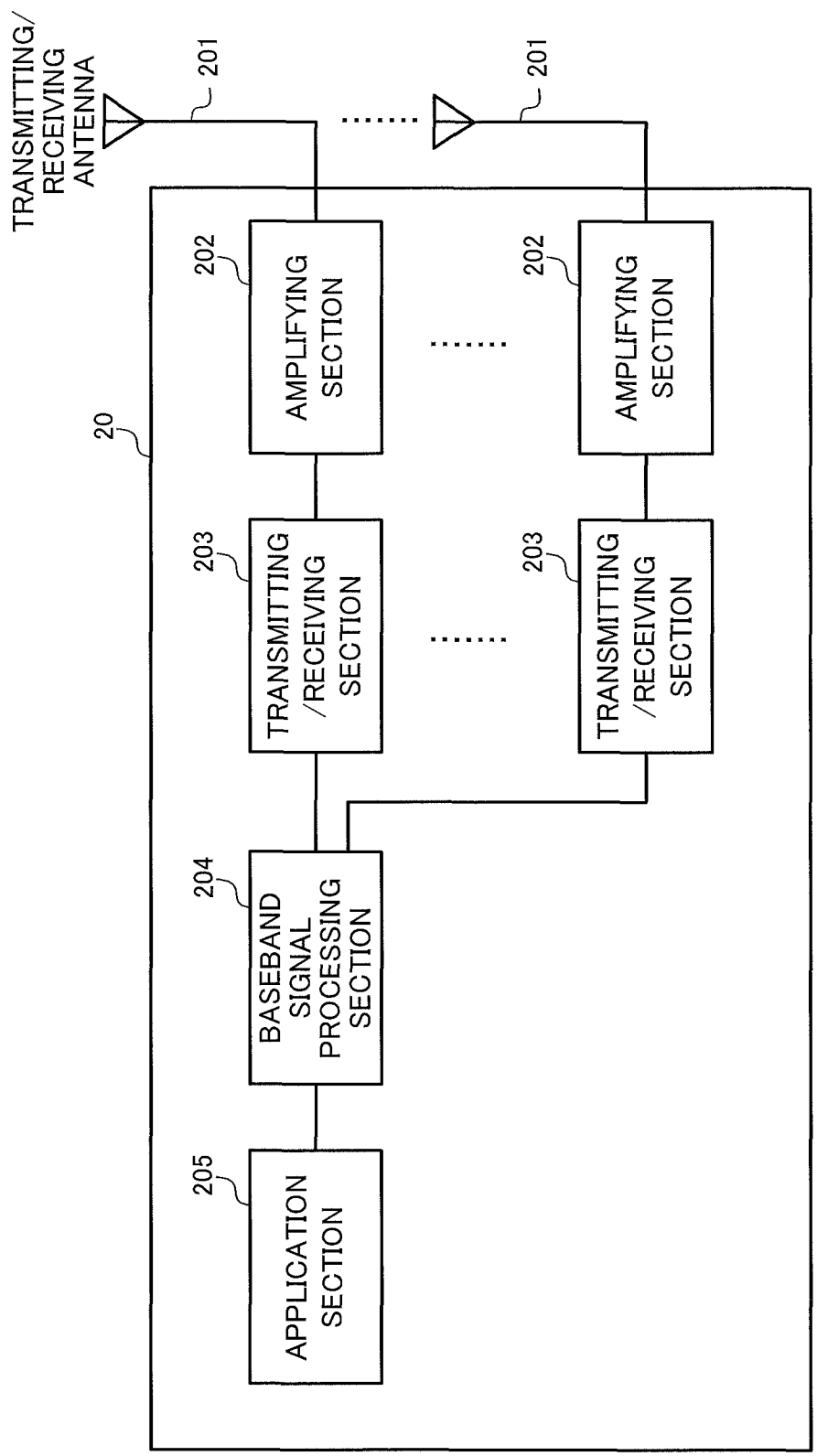
FIG. 13 is a diagram to explain an overall structure of a user terminal according to the present embodiment.

FIG. 13 is a diagram to show an overall structure of a user terminal 20 according to the present embodiment. The user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in a plurality of transmitting/receiving antennas 201 are each amplified in the amplifying sections 202, and subjected to frequency conversion and converted into baseband signals in the transmitting/receiving sections 203. These baseband signals are subjected to an FFT process, error correction decoding, a retransmission control (HARQ-ACK) receiving process and so on, in the baseband signal processing section 204. In this downlink data, downlink user data is transferred to the application section 205. The application section 205 performs processes related to higher layers above the physical layer and the MAC layer, and so on. Also, in the downlink data, broadcast information is also transferred to the application section 205.

Meanwhile, uplink user data is input from the application section 205 into the baseband signal processing section 204. The baseband signal processing section 204 performs a retransmission control (HARQ (HARQ-ACK)) transmission process, channel coding, pre-coding, a DFT process, an IFFT process and so on, and transfers the result to each transmitting/receiving section 203. The baseband signals that are output from the baseband signal processing section 204 are converted into a radio frequency band in the transmitting/receiving sections 203. After that, the amplifying sections 202 amplify the radio frequency signals having been subjected to frequency conversion, and transmit the results from the transmitting/receiving antennas 201.

Figure 14:
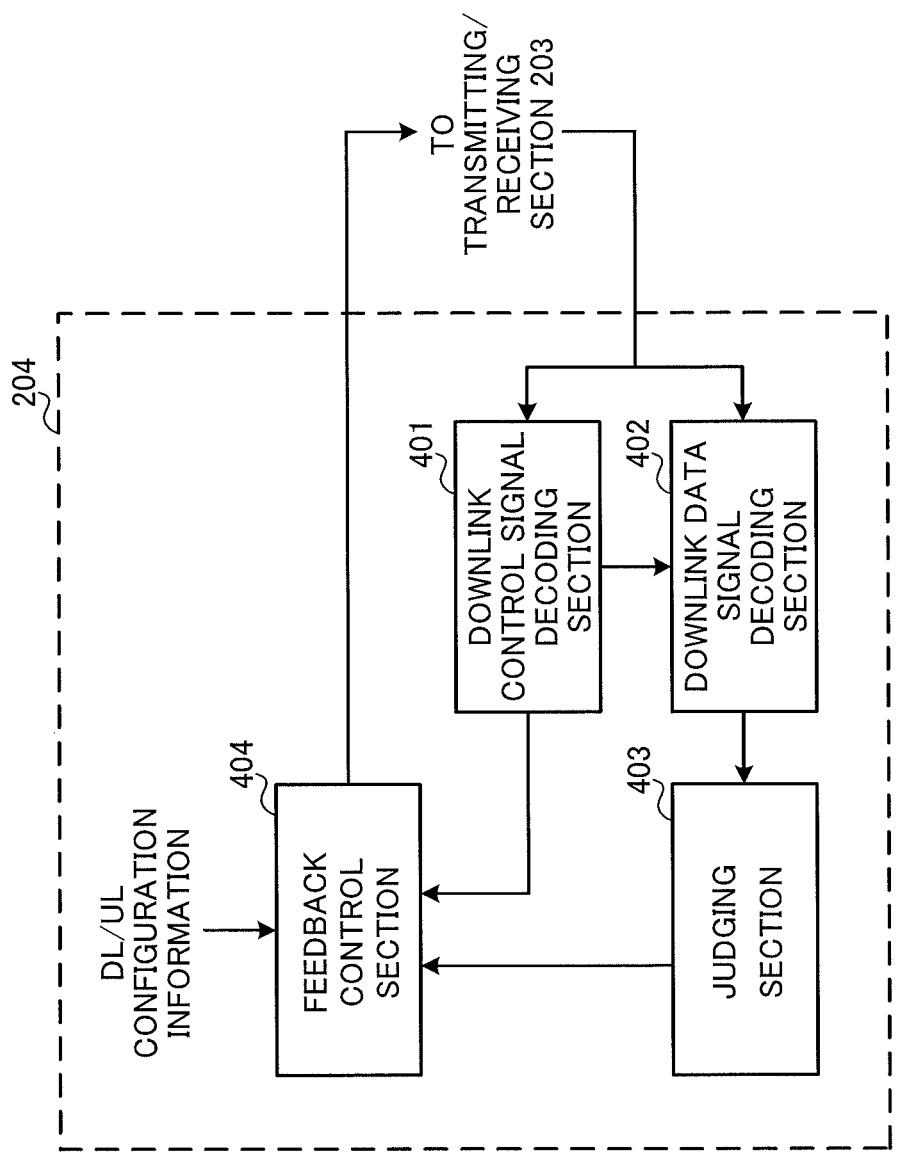
FIG. 14 is a diagram to explain a functional structure of a user terminal according to the present embodiment.

FIG. 14 is a diagram to show a principle functional structure of the baseband signal processing section 204 provided in the user terminal 20. As shown in FIG. 14, the baseband signal processing section 204 provided in the user terminal 20 has at least a downlink control signal decoding section 401, a downlink data signal decoding section 402, a judging section 403 and a feedback control section 404. Note that, as noted earlier, the baseband signal processing section 204 has functional sections for performing channel coding, pre-coding, a DFT process, an IFFT process and so on.

The downlink control signal decoding section 401 decodes the downlink control signals (UL grant, DL assignment) transmitted in the downlink control channel (PDCCH), and outputs the scheduling information (information about the allocation to uplink resources, and so on) to the feedback control section 404. The downlink data signal decoding section 402 decodes the downlink data signals transmitted in the downlink shared channel (PDSCH) and outputs the result to the judging section 403.

Based on the decoding result in the downlink data signal decoding section 402, the judging section 403 judges the retransmission control for each DL subframe (delivery acknowledgement (ACK/NACK)). The delivery acknowledgement judgment results in the judging section 403 are output to the feedback control section 404.

Based on the scheduling information output from the downlink control signal decoding section 401 and the retransmission control judgment results output from the judging section 403, the feedback control section 404 controls the generation of the delivery acknowledgement signals (ACK/NACK), the allocation to PUCCH resources, the time to send feedback, and so on.

To be more specific, the feedback control section 404 employs the above-described feedback mechanism when the number of DL subframes that correspond to a UL subframe is greater than a predetermined value in the radio frame after a reconfiguration of the DL/UL configuration. For example, as shown in FIG. 6, the feedback control section 404 bundles at least part of the delivery acknowledgement signals for a plurality of DL subframes (DL subframes 5 to 8 in FIG. 6) that correspond to that UL subframe and send feedback. In this case, the feedback control section 404 can employ channel selection based on PUCCH format 1b by using the PUCCH resources to correspond to DL subframes 0, 1, 4 and 5.

On the other hand, when the number of DL subframes that correspond to a UL subframe is equal to or less than a predetermined value, the feedback control section 404 employs channel selection based on PUCCH format 1b by using the PUCCH resources that correspond to the DL subframe respectively, as in conventional systems. Note that the feedback method is by no means limited to the method shown in above FIG. 6, and the methods shown in above FIG. 7 to FIG. 9 are equally applicable.

In this way, when the number M of DL subframes that correspond to a UL subframe is greater than a predetermined value, the delivery acknowledgement signals for at least part of the DL subframes are bundled into predetermined bits, and a predetermined number of PUCCH resource are reserved. By this means, it becomes possible to use channel selection properly (that is, send feedback without changing the PUCCH format) even when the number of DL subframes that correspond to a UL subframe increases following a reconfiguration of the DL/UL configuration. Also, with the present embodiment, part of the delivery acknowledgement signals for a plurality of DL subframes is bundled, instead of bundling all the delivery acknowledgement signals together into one bit, so that it is possible to reduce the resources to use in retransmission. Also, even when the number M of DL subframes to correspond to one UL subframe is greater than a predetermined value, PUCCH resources to correspond to part of the DL subframes are reserved, instead of reserving PUCCH resources that correspond to all of the DL subframes respectively. By this means, it is possible to effectively reduce the collisions of PUCCH signals and allow effective use of resources.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2013-111255, filed on May 27, 2013, including the specification, drawings and abstract, is incorporated herein by reference in its entirety.

The invention claimed is:

1. A user terminal that communicates in time division duplexing with a radio base station that reconfigures a downlink (DL)/uplink (UL) configuration, the user terminal comprising:
   a processor and a memory, wherein the processor:
   judges a delivery acknowledgement in response to each DL subframe; and
   allocates a delivery acknowledgement signal in response to each DL subframe to a UL subframe and sends feedback,
   wherein, when the number of DL subframes that correspond to a UL subframe is greater than a predetermined value in a radio frame after the reconfiguration of the DL/UL configuration, the processor bundles at least part of delivery acknowledgement signals for a plurality of DL subframes corresponding to the UL subframe, and sends feedback, and
   wherein, when the number of DL subframes that correspond to the UL subframe is greater than the predetermined value, the processor sets a plurality of bundling groups, which serve as a bundling unit of DL subframes, selects the DL subframe that is arranged first in a time axis direction in each bundling group, and employs channel selection based on physical uplink control channel (PUCCH) format 1b by using PUCCH resources that correspond to the DL subframes selected from each bundling group.

2. The user terminal according to claim 1, wherein, when the number of DL subframes that correspond to the UL subframe is equal to or less than the predetermined value, the processor employs channel selection based on PUCCH format 1b by using PUCCH resources that correspond respectively to the DL subframes.

3. The user terminal according to claim 1, wherein, when the number of DL subframes that correspond to the UL subframe is greater than the predetermined value, the processor controls bundling so that the number of DL subframes included in each bundling group is equal.

4. The user terminal according to claim 1, wherein the processor judges the number of DL subframes that correspond to each UL subframe in the radio frame after the reconfiguration of the DL/UL configuration based on information regarding the DL/UL configuration, which is reported from the radio base station.

5. A radio base station that communicates with a user terminal in time division duplexing, and that reconfigures and controls a downlink (DL)/uplink (UL) configuration, the radio base station comprising:
   a processor that controls a reconfiguration of the DL/UL configuration;
   a transmitter that transmits information regarding the DL/UL configuration to the user terminal; and
   a receiver that receives a delivery acknowledgement signal that is fed back from the user terminal,
   wherein, when the number of DL subframes that correspond to a UL subframe is greater than a predetermined value in a radio frame after the reconfiguration of the DL/UL configuration, the receiver receives a delivery acknowledgement signal, in which at least part of a plurality of DL subframes that correspond to the UL subframe is bundled, in a predetermined physical uplink control channel (PUCCH) resource,
   wherein, when the number of DL subframes that correspond to the UL subframe is greater than the predetermined value, the predetermined PUCCH resource is selected, by employing channel selection based on PUCCH format 1b, out of PUCCH resources that correspond to the DL subframes selected from a plurality of bundling groups,
   wherein the plurality of bundling groups, which serve as a bundling unit of DL subframes, are set by the user terminal, and
   wherein each of the DL subframes, which are selected by the user terminal, are arranged first in a time axis direction in each bundling group.

6. A radio communication method for a radio base station that reconfigures a downlink (DL)/uplink (UL) configuration and a user terminal that communicates with the radio base station in time division duplexing, the radio communication method comprising, in the user terminal, the steps of:
   judging a delivery acknowledgement in response to each DL subframe; and
   allocating a delivery acknowledgement signal in response to each DL subframe to a UL subframe and sends feedback,
   wherein, when the number of DL subframes that correspond to a UL subframe is greater than a predetermined value in a radio frame after the reconfiguration of the DL/UL configuration, at least part of delivery acknowledgement signals for a plurality of DL subframes corresponding to the UL subframe is bundled and fed back, wherein, when the number of DL subframes that correspond to the UL subframe is greater than the predetermined value, physical uplink control channel (PUCCH) resources that correspond to the DL subframes selected from a plurality of bundling groups are used to employ channel selection based on PUCCH format 1b, wherein the plurality of bundling groups, which serve as a bundling unit of DL subframes, are set by the user terminal, and wherein each of the DL subframes, which are selected by the user terminal, are arranged first in a time axis direction in each bundling group.

7. The user terminal according to claim 2, wherein, when the number of DL subframes that correspond to the UL subframe is greater than the predetermined value, the processor controls bundling so that the number of DL subframes included in each bundling group is equal.

* * * * *